(12) United States Patent
Magerl et al.

(10) Patent No.: US 12,734,600 B2
(45) Date of Patent: Sep. 15, 2026

(54) METHOD FOR LIMITING THE WELDING POWER OF A WELDING DEVICE

(71) Applicant: Fronius International GmbH, Pettenbach (AT)

(72) Inventors: Christian Magerl, Wels-Thalheim (AT); Franz Peter Musil, Wels-Thalheim (AT); Peter Lattner, Wels-Thalheim (AT); Robert Eberl, Wels-Thalheim (AT)

(73) Assignee: Fronius International GmbH, Pettenbach (AT)

( * ) Notice: Subject to any disclaimer, the term of this patent is extended or adjusted under 35 U.S.C. 154(b) by 712 days.

(21) Appl. No.: 18/039,112

(22) PCT Filed: Nov. 30, 2021

(86) PCT No.: PCT/EP2021/083516

§ 371 (c)(1),
(2) Date: May 26, 2023

(87) PCT Pub. No.: WO2022/117546

PCT Pub. Date: Jun. 9, 2022

(65) Prior Publication Data

US 2024/0001474 A1 Jan. 4, 2024

(30) Foreign Application Priority Data

Dec. 1, 2020 (EP) .................................... 20210958

(51) Int. Cl.
*B23K 9/10* (2006.01)
*B23K 9/095* (2006.01)

(52) U.S. Cl.
CPC .......... *B23K 9/1062* (2013.01); *B23K 9/0956* (2013.01); *B23K 9/0953* (2013.01)

(58) Field of Classification Search
CPC .. B23K 9/0953; B23K 9/1062; B23K 9/1006; B23K 9/0956; B23K 9/1043;
(Continued)

(56) References Cited

U.S. PATENT DOCUMENTS 5,499,178 A * 3/1996 Mohan .................. H02J 3/1842 363/39
6,472,633 B1 * 10/2002 Reynolds ............. B23K 9/1062 219/130.32

(Continued)

FOREIGN PATENT DOCUMENTS

CN 1469791 1/2004
CN 109641305 4/2019

(Continued)

OTHER PUBLICATIONS

Int'l Search Report (Form PCT/ISA/210) conducted in Int'l Appln. No. PCT/EP2021/083516 (Apr. 5, 2022).

(Continued)

*Primary Examiner* — Vy T Nguyen
(74) *Attorney, Agent, or Firm* — GREENBLUM & BERNSTEIN, P.L.C.

(57) ABSTRACT

The aim of the invention is to enable a stable welding process. This is achieved in that a welding device is supplied with a supply power by an energy source and converts at least a part of the supply power into a welding power in order to generate a welding arc, wherein the welding power is regulated by specifying a welding current. For this purpose, the supply voltage is determined, and the maximum supply current that can be delivered to the welding device from the energy source is specified. A maximum supply power is calculated using the supply voltage and the maximum supply current. The maximum welding power that is delivered by the welding device is determined from the (Continued)

Figure 1:
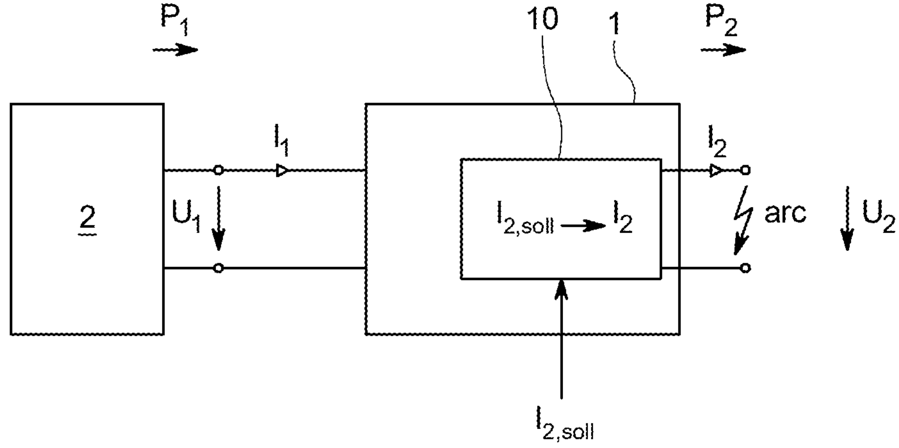

maximum supply power, and the welding power is limited to the maximum welding power that can be delivered.

7 Claims, 5 Drawing Sheets

(58) Field of Classification Search
CPC .... B23K 9/125; B23K 9/1056; B23K 9/0732; B23K 9/095; B23K 9/09; B23K 9/1012; B23K 9/124; B23K 9/091; B23K 9/092; B23K 9/093; B23K 9/1087; B23K 9/16; B23K 9/167; B23K 9/173; B23K 9/0731; B23K 9/0738
USPC ................. 219/130.1, 130.33, 130.5, 130.32
See application file for complete search history.

(56) References Cited

U.S. PATENT DOCUMENTS 6,930,280 B2 8/2005 Zauner et al.
2009/0277893 A1 11/2009 Speilman
2011/0309053 A1 12/2011 Baus
2016/0318113 A1 11/2016 Enyedy et al.
2018/0056428 A1 3/2018 Lidander et al.
2018/0257162 A1 9/2018 Johnson et al.

FOREIGN PATENT DOCUMENTS

CN 110382152 10/2019
DE 35 23 879 1/1987
JP H10-156537 6/1998
WO 2020/008679 1/2020

OTHER PUBLICATIONS

Int'l Written Opinion (Form PCT/ISA/237) conducted in Int'l Appln. No. PCT/EP2021/083516 (Apr. 5, 2022).
Japan Reason for Refusal (OA) conducted in counterpart Japan Appln. No. 2023-532481 (Aug. 21, 2024).
Japan Search Report (SR) conducted in counterpart Japan Appln. No. 2023-532481 (Aug. 21, 2024).
China Office Action conducted in counterpart China Appln. No. 202180080794.5 (Jun. 19, 2025).

* cited by examiner

METHOD FOR LIMITING THE WELDING POWER OF A WELDING DEVICE

The present invention relates to a method for operating a welding device, wherein the welding device is supplied with a supply power by an energy source and converts at least a part of the supply power into a welding power in order to generate a welding arc, wherein the welding power is regulated by specifying a welding current, wherein a supply voltage is determined. Furthermore, the present invention relates to a welding device for generating a welding arc by converting a supply power into a welding power, wherein the welding device is designed to regulate the welding power using a specified welding current.

A welding device generates a welding voltage and a welding current at an electrode during a welding process, i.e., during the ignition and burning of a welding arc. The welding device delivers a welding power through the welding arc, wherein the welding power in turn is the product of the welding voltage and the welding current. The welding device is supplied with a supply power from an energy source, wherein, for example, an energy supply network or a generator can be provided as an energy source. For the energy source to supply the welding device, it is of course also possible to provide voltage converters (inverters, rectifiers, converters, etc.) between the energy source and the welding device. The conversion of the supply power to the welding power is carried out by a power component, wherein the welding device regulates the welding power by specifying the welding current. For example, the welding current can be regulated to a specified setpoint value. For example, the welding voltage can be manually adjusted by the length of the arc.

There are known methods for limiting the welding power to be delivered. DE 35 23 879 A1 discloses a method for limiting the welding power in order to prevent spattering during welding. This is done by measuring the welding power using the welding current and a welding voltage, and then limiting it to a specified limit value.

US 2018/0056428 A1 discloses a power supply for a welding device, which power supply has a functionality for dynamic power limitation. For this purpose, a control module of the power supply provides static and dynamic parameters of the power supply, such as information about a maximum power loss, a maximum useful power, temperature or power reduction, actual input and output voltage values, actual input and output current values, etc., of other modules of the power supply. Based upon the static and/or dynamic parameters, the control module then determines a maximum output power or power loss, as well as a maximum permissible output power or power loss, as dynamic output constraints, and adjusts the output parameters (i.e., output voltage, output current, and/or output power) based upon this.

Furthermore, US 2009/0277893 A1 discloses a welding system and an associated method in which an output power characteristic is determined on the basis of input configuration parameters (e.g., wire diameter, material thickness, etc.). The current input voltage or input power is then monitored and compared to an ideal input voltage or input power—for example, without fluctuations, etc. In the event of deviations of the current input power from the ideal input power, the output power is then adjusted according to the determined output characteristic.

It is an object of the present invention to specify a welding method and a welding device that enables a stable welding process.

According to the invention, this object is achieved by a method, wherein a maximum supply current that can be delivered by the energy source to the welding device is specified and a maximum supply power is calculated using the supply voltage and the maximum supply current, a maximum welding power delivered by the welding device is determined from the maximum supply power, and the welding power is limited to the maximum welding power that can be delivered.

Furthermore, the object is achieved by a welding device, wherein a calculation unit is provided, which is designed to calculate a maximum supply power from a supply voltage of the welding device and a maximum supply current that can be delivered from the energy source to the welding device, and to determine a maximum welding power delivered by the welding device from the maximum supply power, and wherein a limiting unit is provided that is designed to limit the delivered welding power to the maximum welding power that can be delivered. Thus, the maximum welding power that can be delivered is taken into account when regulating the welding power.

The welding power is therefore not limited on the basis of a previously known limit value, but on the basis of the present maximum supply power, which in turn results from the use of the present supply voltage. The present maximum welding power can in turn be determined from the present maximum supply power, on the basis of which the welding power to be delivered is limited. This prevents the welding device from trying to regulate a welding power that cannot be delivered at all. In this way, an undesired termination of the welding process by an undesired break off of the welding arc can be prevented. Fluctuations in the supply voltage can occur in particular due to long supply lines between the energy source and the welding device, or when using a generator as the energy source.

It is advantageous if a measuring unit is provided that is designed to measure the supply voltage. This ensures that the present supply voltage is known. It is of course also conceivable for the supply voltage to be specified in a different manner—for example, when the welding device is connected to an energy source having a different supply voltage.

Advantageously, the welding power is limited by limiting the welding current. For this purpose, the limiting unit can be designed to limit the welding current in order to limit the delivered welding power to the maximum welding power that can be delivered. If a current regulator is used to regulate the welding power via the welding current, this can be done by limiting the setpoint value (i.e., the setpoint current) and/or the manipulated variable of the current regulator. If the manipulated variable is limited, it is advantageous to implement an anti-wind-up measure in order to prevent the current regulator from attempting to correct the limited manipulated variable. Anti-wind-up measures are basically known, which is why they will not be discussed in more detail here.

It is advantageous to specify a maximum supply current, preferably by a user or by automatic detection which maximum supply current can be delivered from the energy source to the welding device or can be accommodated by the welding device, and if the maximum supply power is calculated from the supply voltage and the maximum supply current. The maximum supply current can correspond to a switch-off current of an overcurrent fuse. In contrast to the supply voltage, which is assumed to be variable, the maximum supply current is fixed. In this case, it is assumed that the supply current does not exceed the maximum supply current.

Preferably, the maximum welding power delivered by the welding device is determined from the maximum supply power that can be delivered from the energy source to the welding device, taking into account an operating power. In this case, the supply power is used not only to deliver the welding power, but also to supply operating power for further operation of the welding device. Thus, the maximum welding power is limited by the supply power minus the operating power. This means that the maximum welding power corresponds to the maximum supply power minus the operating power.

The limiting unit can be designed to be activated and deactivated. Thus, for example, a user can decide whether the welding power is limited when the power variable changes, or whether such an intervention is not desired. It may be advantageous to deactivate the limiting unit—particularly if the supply voltage is not expected to change.

Figure 2:
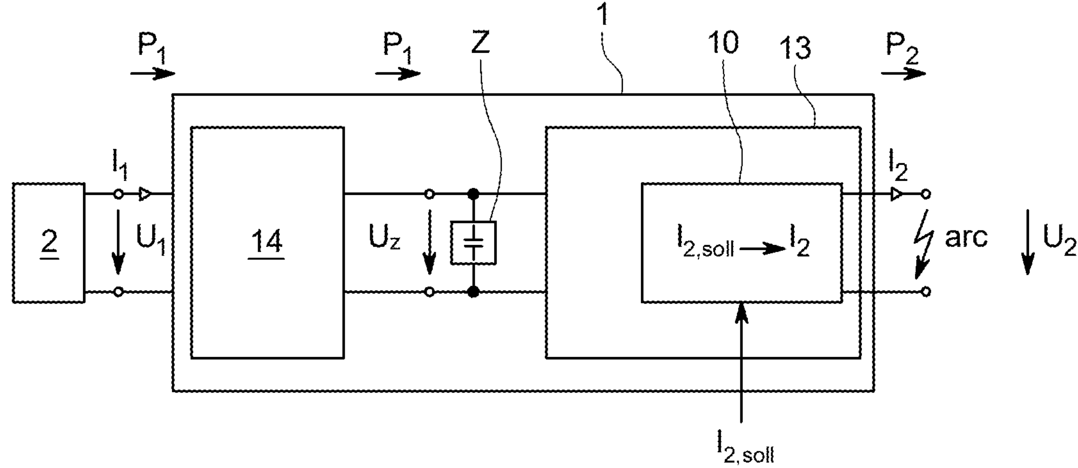
Figure 3:
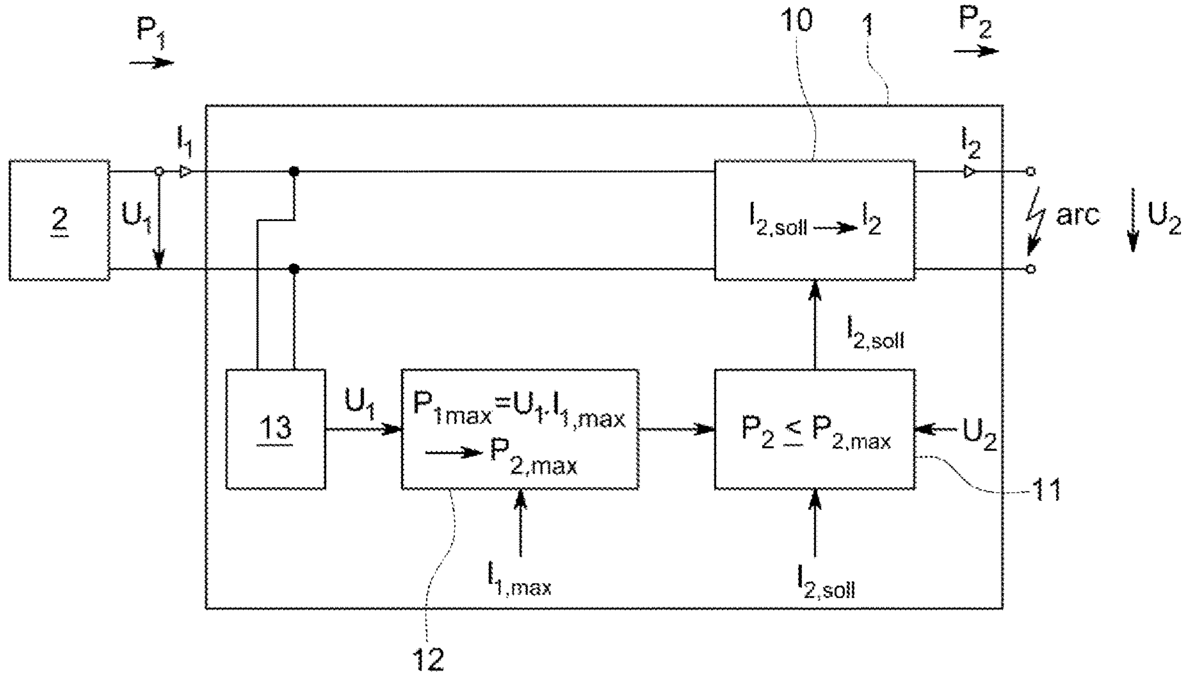
Figure 4A:
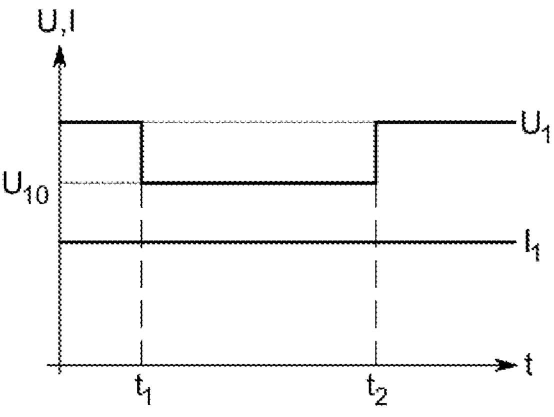
Figures 5A, 5B, 5C:
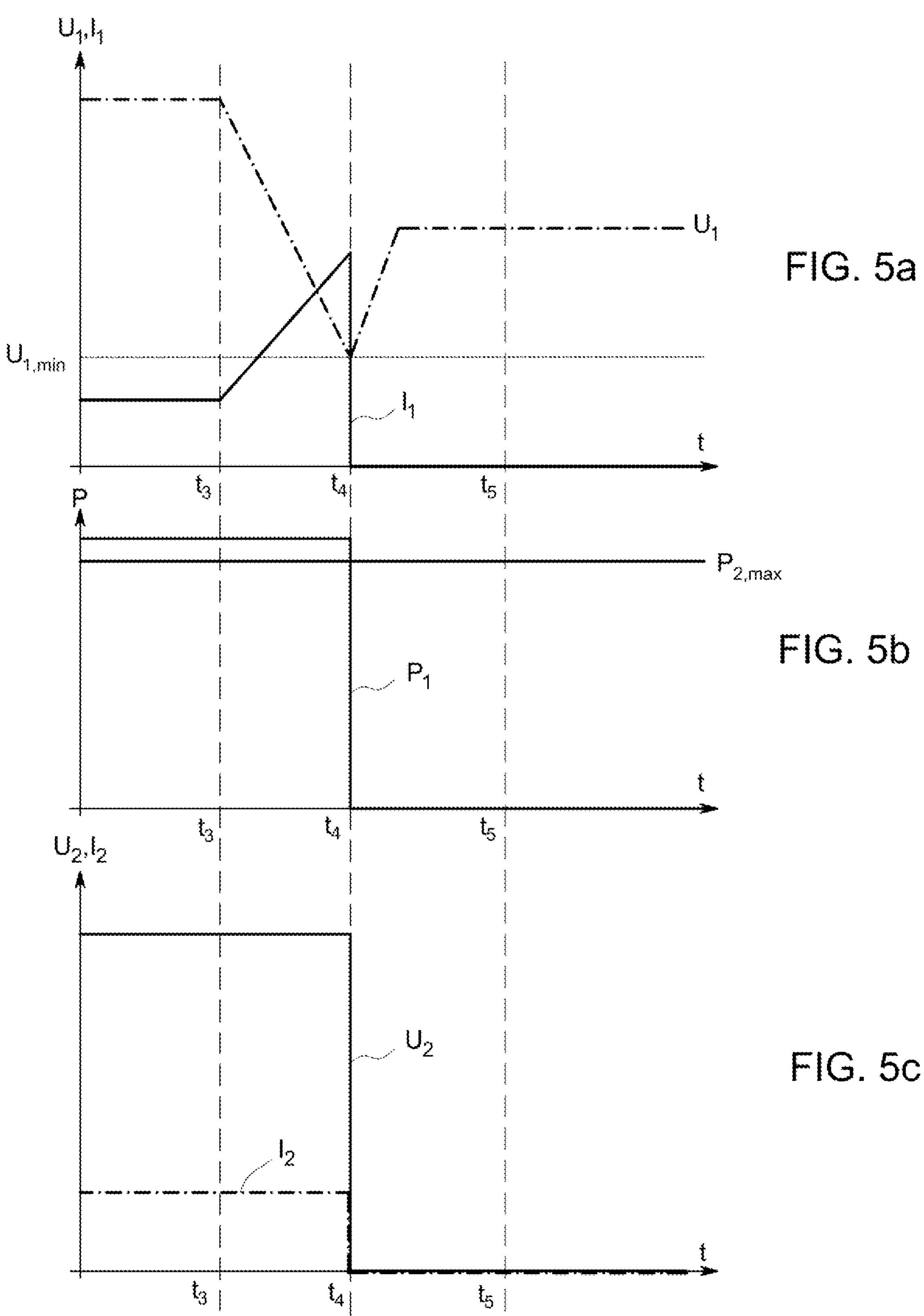
Figures 6A, 6B, 6C:
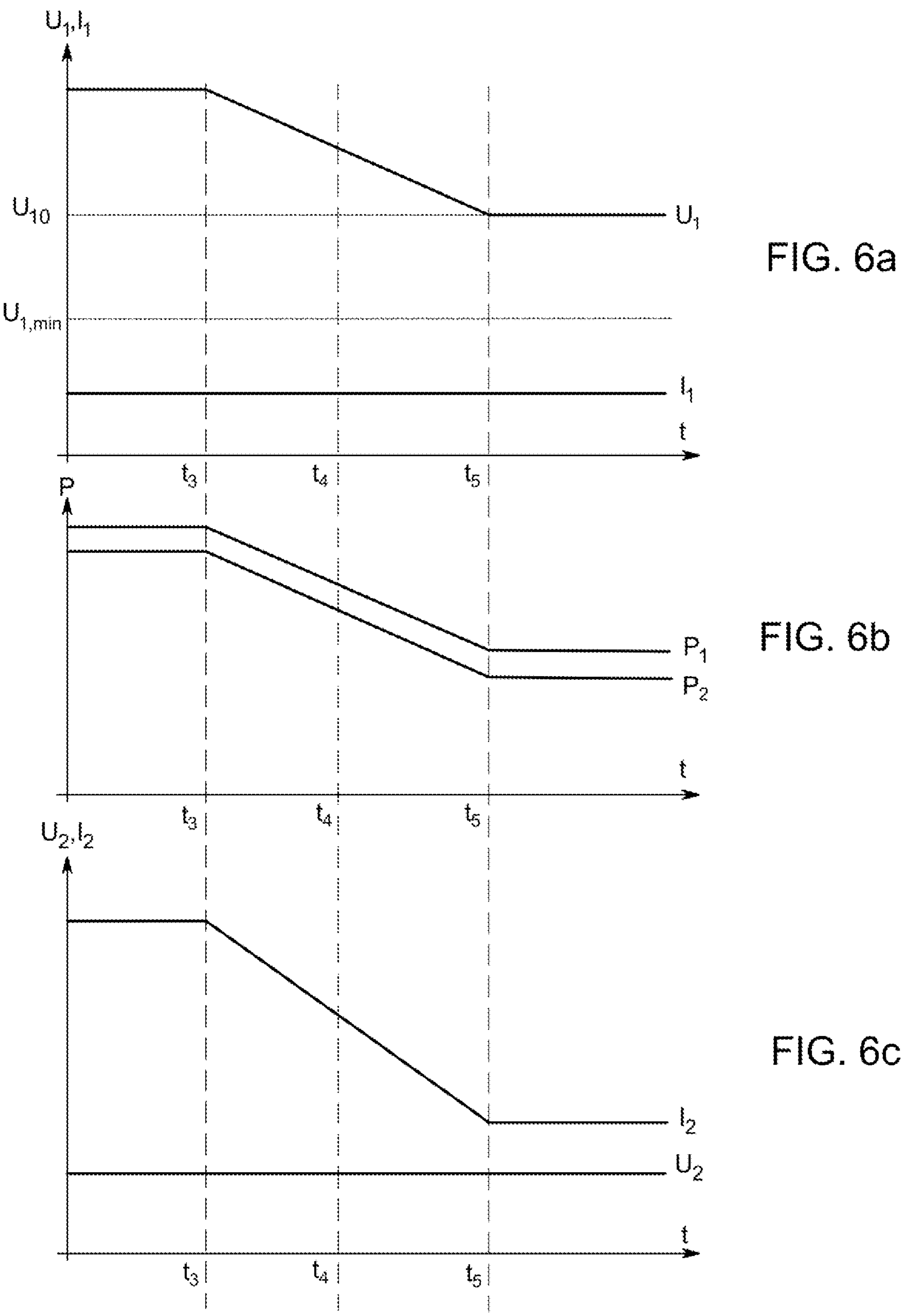

The present invention is described in greater detail below with reference to FIGS. 1 through 6*c*, which show, by way of example, advantageous embodiments of the invention in a schematic and non-limiting manner. The following are shown:

FIG. 1 a schematic welding device,

FIG. 2 a schematic welding device with a welding power part,

FIG. 3 a welding device with a calculation unit and a limiting unit,

FIGS. 4*a, b, c* the time profiles of supply voltage, supply current, welding power, welding voltage, and welding current, FIGS. 5*a, b, c* the detailed profiles of supply voltage, supply current, welding power, welding voltage, and welding current when the supply voltage drops, FIGS. 6*a, b, c* the detailed profiles of supply voltage, supply current, welding power, welding voltage, and welding current in the case of a limitation according to the invention.

FIG. 1 shows a schematic welding device 1 that is supplied with a supply power $P_1$ from an energy source 2. To this end, the energy source 2 provides a supply voltage $U_1$ and a supply current $I_1$ to the welding unit 1, wherein the supply power $P_1$ can be represented as the product of the supply voltage $U_1$ and the supply current $I_1$: $P_1=U_1 \cdot I_1$.

During a welding operation, the welding unit 1 generates a welding arc at an electrode by delivering a welding power $P_2$. The welding power $P_2$ can be represented as the product of the welding current $I_2$ and the welding voltage $U_2$: $P_2=U_2 \cdot I_2$. Thus, during the welding operation, i.e., in the case of a burning welding arc, the welding device 1 generates, i.e., ignites and actively maintains, a welding current $I_2$ flowing over the electrode, while the welding voltage $U_2$ is set on the electrode. The welding voltage $U_2$ is known, for example, by measurement.

A welding regulator 10 is further provided in order to regulate the welding power $P_2$. In the figures shown, a current regulator is provided as a welding regulator 10, which current regulator regulates the welding current $I_2$ in order to regulate the welding power $P_2$. A setpoint variable is specified for the welding regulator 10, e.g., by a user, in order to regulate the welding power $P_2$. In the current regulator shown, a setpoint current $I_2$ is specified in order to regulate the welding current $I_2$. During the delivering of the welding current $I_2$, the welding voltage $U_2$ is set, which welding voltage can be influenced, for example, by adjusting the length of the welding arc—for example, by changing the distance between the welding torch/electrode and the workpiece. This means that the welding power $P_2$ is specified on the one hand by the welding current $I_2$ regulated according to the set setpoint current $I_{2,soll}$, and on the other by the welding voltage $U_2$.

As shown in FIG. 2, the welding device 1 can also comprise a voltage converter 14, i.e., an AC/DC converter or a DC/DC converter, and a welding power part 13 connected to the voltage converter 14, wherein the voltage converter 14 converts the supply voltage $U_1$ into an intermediate circuit voltage U z applied to a capacitive intermediate circuit Z, whereby the supply power P is temporarily stored in the intermediate circuit Z. The welding power part 13 is fed by the intermediate circuit Z and, during the welding process, delivers the welding current $I_2$ and thus the welding power $P_2$ according to the specification of the welding regulator 10. The different fundamental design possibilities of welding devices 1 are known, which is why they will not be discussed in more detail here.

In FIG. 3, the general welding device 1 of FIG. 1 is used to illustrate the invention. Of course, the invention can also be applied to the welding device 1 according to FIG. 2 or other types of welding devices 1.

According to the invention, a calculation unit 12 is provided that is designed to calculate the maximum supply power $P_{1,max}$ that can be delivered from the energy source 2 to the welding device 1. Advantageously, the maximum supply power $P_{1,max}$ is calculated from the product of the supply voltage $U_1$, which is initially assumed to be constant, and a maximum supply current $I_{1,max}$ that can be delivered by the energy source 1; $P_{1,max}=U_1 \cdot I_{1,max}$. The supply voltage $U_1$ is preferably determined by a measuring unit 13.

The maximum supply current can be specified by a switch-off current of an overcurrent fuse, and adjusted or also preset by a user manually on the welding device 1 or by automatic detection of the type of energy source 2.

The maximum welding power $P_{2,max}$ that can be delivered by the welding device 1 basically corresponds to the maximum supply power $P_{1,max}$ received by the welding device 1 (and thus delivered by the energy source 2). However, it is also possible to provide an operating power $P_b$ necessary for the operation of the welding device 1—for example, for intermediate storage of intermediate energy in the intermediate circuit Z. If the operating power $P_b$ is also obtained from the supply power $P_1$, the operating power $P_b$ is subtracted from the supply power when determining the maximum welding power $P_{2,max}$: $P_{2,max}=P_{1,max}-P_b$.

The operating power $P_b$ can also be represented as the product of the supply voltage $U_1$ and an operating current $I_b$, whereby the maximum welding power $P_{2,max}$ can be expressed in turn as $P_{2,max}=U_1(I_{1,max}-I_b)$.

It may happen that the welding regulator 10 corrects a welding current $I_2$ that, in conjunction with the occurring welding voltage $U_2$, would produce a welding power $P_2$ that exceeds the maximum welding power $P_{2,max}$. This can happen, for example, if the maximum welding power $P_2$ max that can be delivered has decreased, e.g., due to a reduced supply voltage $U_1$, or if the welding voltage $U_2$ increases.

To ensure that the actually occurring welding power P 2 does not exceed the maximum welding power $P_{2,max}$, the welding current $I_2$ is regulated to a specified setpoint value $I_{2,soll}$ in such a way that the product of the welding current $I_2$ and welding voltage $U_2$ does not exceed the current welding power $P_{2,max}$. If the welding power $P_2$ is not limited, the welding arc may break due to an excessive increase in the supply current $I_1$ (and corresponding switching off of an overcurrent fuse) and/or a supply voltage $U_1$ that drops too far below a critical supply voltage $U_{1,min}$ (below which no welding operation is possible), Therefore, the welding power $P_2$ is limited to the maximum welding power $P_{2,max}$ by a limiting unit 11.

This is preferably done by limiting the welding current $I_2$, which can in turn be done by limiting the setpoint variable $I_{2,soll}$ of the regulated welding current $I_2$, as indicated in FIG. 3. However, it is also possible to limit the manipulated variable of the welding regulator 10. Limiting the welding current $I_2$ can ensure that the welding voltage $U_2$ can be maintained when the welding power $P_2$ is reduced.

The limitation of the welding current $I_2$ (i.e., the controlled variable) is described below. At a present point in time, the differential welding power $\Delta P_2$ is determined, which is the difference between the maximum welding power $P_{2,max}$ and the welding power $P_2$ to be delivered: $\Delta P_2 = P_{2,max} - P_2$.

To limit the welding power for the present regulating step $P_{2,i}$ the welding power $P_{2,i}$ can be used filtered ($P_{2,i}$=filter ($P_{2,max} - P_b$)) or unfiltered.

If power losses $P_{loss}$ are also taken into account, the welding power $P_{2,i} = P_{2,max} - P_b - P_{loss}$ or the filtered welding power $P_{2,i}$=filter ($P_{2,max} - P_b - P_{loss}$) is obtained. The power loss $P_{loss}$, however, preferably describes switching and conducting losses in semiconductor switches (transistors) and, for example, ohmic losses in lines, transformers, etc. The power temporarily stored in the intermediate circuit Z is, on the other hand, included in the operating power $P_b$.

Furthermore, the welding current $I_{2,i}$ can be determined for the present regulation step from the quotient of the welding power $P_{2,i}$ of the present time and the presently occurring welding voltage $U_2$ $$I_{2,i} = \frac{P_{2,i}}{U_2}.$$

The setpoint current $I_{2,soll}$ can thus be adjusted accordingly. The welding current $I_2$ is thus limited in each case in the present regulation step, which in turn limits the welding power $P_2$. It can in the process be achieved that the welding voltage $U_2$ and thus the welding arc are maintained.

Figure 4B:
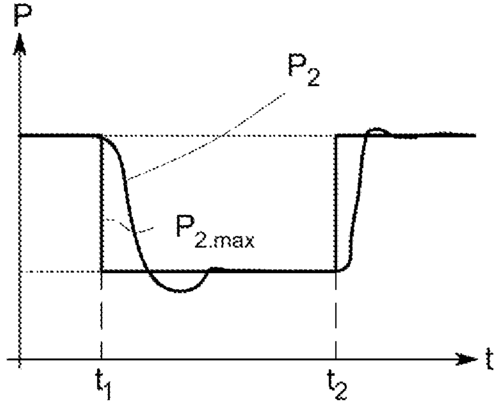
Figure 4C:
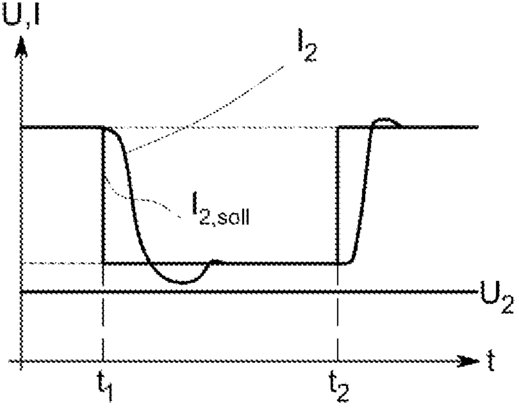

Accordingly, FIGS. 4*a*, 4*b*, 4*c* show profiles of the supply voltage $U_1$, the welding current $I_2$, and the welding voltage $U_2$.

FIG. 4*a* shows exemplary profiles of the supply voltage $U_1$ and the supply current $I_1$. The supply current $I_1$ is continuously constant in FIG. 4*a*. The supply voltage $U_1$ is located at a first voltage value up to a first time $t_1$, decreases to a reduced supply voltage $U_{10}$ after the first time $t_1$ up to a second time $t_2$, and rises again to the original first voltage value after the second time $t_2$. The jump in the supply voltage $U_1$ from a first constant voltage value to a constant reduced supply voltage $U_{10}$ and the subsequent sudden rise back to the first constant voltage value serve only for the sake of simpler representation, and therefore only shown as an example. A drop in the supply voltage $U_1$ can be generated, for example, by an overload, a malfunction, etc., of the energy source 2 and/or a supply line from the energy source 2 to the welding device 1. The profile of the supply power $P_1$ (not explicitly shown) corresponds to the profile of the supply voltage $U_1$ in the case shown, because the supply current $I_1$ is constant.

FIG. 4*b* shows the profile of the welding power $P_2$, and FIG. 4*c* shows the profile of the welding current $I_2$ using the method according to the invention. The welding current $I_2$ is regulated to the unchanged setpoint current $I_{2,soll}$ up to time $t_1$. The product of the welding current $I_2$ and the welding voltage $U_2$ is the welding power $P_2$.

From the first time #1, the supply voltage $U_1$ drops to the reduced supply voltage $U_{10}$, as described above. As a result, from the first time $t_1$, the maximum supply power $P_{1,max}$ also drops, because the maximum supply current $I_{1,max}$ is constantly specified.

Thus, from the first time $t_1$, the welding power $P_2$ also drops to the now reduced maximum welding power $P_{2,max}$, which results from the maximum supply power $P_{1,max}$. If the welding current $I_2$ continues to be regulated to the unchanged target current $I_{2,soll}$ from the first time (without limitation), the supply current $I_1$ would increase, as described below with respect to FIGS. 5*a, b, c*.

Therefore, the welding current $I_2$ (FIG. 4*c*) is preferably limited from the first time $t_1$, which can be done by intervention in the setpoint current $I_{2,soll}$ or the manipulated variable of the welding regulator 10. The welding power $P_2$ limited in this way results, between the first time $t_1$ and the second time $t_2$, from the specified welding voltage $U_2$, given only as an example, and from the regulated welding current $I_2$, which is limited here. The rise time, the time delay, and the overshoot and undershoot of the welding power $P_2$ in FIG. 4*b* and of the welding current $I_2$ in FIG. 4*c* are shown in the extreme, and are intended only to give a better understanding of the invention.

The limitation of the welding power $P_2$, as can be seen in FIGS. 4*a, b, c*, is of course not instantaneous, because the welding regulator 10 has to react only to the new setpoint value or manipulated variable. It is fundamentally advantageous, if the limitation of the welding current $I_2$ does not take place abruptly, because it can lead to audible noise.

FIGS. 5*a, b, c* show the detailed profiles of the supply parameters, i.e., 30 the supply voltage $U_1$ and the supply current $I_1$, and the welding parameters, i.e., the welding voltage $U_2$ and the welding current $I_2$, at the first time $t_1$ in FIGS. 4*a*, 4*b*, 4*c*, when the regulation/limitation according to the invention is deactivated or not provided. The first time $t_1$ shown in FIGS. 4*a, b, c* is therefore shown in detail in the form of individual detail times $t_3$, $t_4$, $t_5$. The time between the detail times $t_3$ and $t_5$ can, for example, be 5 ms to 5 s, wherein there is preferably a time period of 200 ms between the detail times $t_3$ and $t_5$.

In FIG. 5*a*, the supply voltage $U_1$ drops, for example, at time point $t_3$—for example, due to external influences (grid fluctuations). In this case, the value of the supply voltage $U_1$ drops until the detail time $t_4$ reaches the critical supply voltage $U_{1,min}$. The energy source 2 can still provide a constant welding current $I_2$ up to the critical supply voltage $U_{1,min}$ (which may vary depending upon the energy source 2). If the critical supply voltage $U_{1,min}$ is reached (or undershot) at time $t_4$, the welding 1 is switched off. The supply current $I_1$ therefore falls to a value of 0 A (FIG. 5*a*). After the supply current h has fallen to 0 A, the supply voltage $U_1$ rises back to a value that is lower than the supply voltage $U_1$ was at time $t_3$.

Because the welding device 1 was switched off at time $t_4$, there is no welding current $I_2$ and no welding voltage $U_2$ (FIG. 5*c*), such that the welding arc breaks. Because the supply current $I_1$ at time $t_4$ falls to 0 A, the supply power $P_1$ also falls to a value of 0 W at the time $t_4$, as shown in FIG. 5*b*.

Analogously to FIGS. 5*a, b, c*, FIGS. 6*a, b, c* show the detailed profiles of the supply parameters and the welding parameters at time $t_1$, wherein the detail times $t_3$, $t_4$, $t_5$ are shown. In contrast to FIGS. 5*a, b, c*, a limitation according to the invention is provided in FIGS. 6*a, b, c*, wherein an instantaneous, idealized regulation is assumed for the sake of simplicity, and therefore the welding current $I_2$ is immediately reduced as soon as the supply voltage $U_1$ drops, whereby, compared to FIGS. 4*b* and 4*c*, there is no time delay, no rise time, and no overshot and undershot of the welding power $P_2$ and the welding current $I_2$. The supply voltage $U_1$ (FIG. 6*a*) is thus also reduced here from the detail time $t_3$—for example, due to external influences. Because the welding current $I_2$ is, however, reduced by the limitation according to the invention, the supply current $I_1$ can be kept constant. As a result, the supply voltage U 1 does not reach or fall below the critical supply voltage $U_{1,min}$, whereby the welding device 1 maintains the welding arc. By means of the method according to the invention, it is thus possible, by reducing the welding current $I_2$, to prevent the supply voltage $U_1$ from dropping too quickly, so that the critical supply voltage is not reached or undershot, and the welding device 1 does not shut down. From the detail time $t_5$, the supply voltage $U_1$ is lowered to the reduced supply voltage $U_{10}$ and remains there; cf. FIG. 4*a*.

As a result of the constant supply current $I_1$ (caused by the limitation of the welding power $P_2$), the profile of the supply power $P_1$ corresponds to the profile of the supply voltage $U_1$. FIG. 6*b* shows the power supply $P_1$ that can be delivered and the welding power $P_2$. The distance between the profiles of the supply power $P_1$ and welding power $P_2$ represents the power loss $P_{loss}$ of the welding system.

The calculation unit 12 and/or the limiting unit 11 may comprise microprocessor-based hardware, e.g., a computer or digital signal processor (DSP), on which corresponding software is executed to perform the respective function. The calculation unit 12 and/or the limiting unit 11 can also comprise integrated circuits, e.g., an application-specific integrated circuit (ASIC) or a field programmable gate array (FPGA), or a configurable programmable logic device (CPLD), and/or, in parallel therewith, can be monitored by a microprocessor. However, the calculation unit 12 and/or the limiting unit 11 may also comprise an analog circuit or analog computer. Mixed forms are conceivable as well. It is also possible for different functions to be implemented on the same hardware and/or on different hardware parts. Mixed forms in which individual units are implemented both in hardware and in software are particularly advantageous.

The invention claimed is:

1. A method for operating a welding device, wherein the welding device is supplied with a supply power from an energy source and converts at least a part of the supply power into a welding power in order to generate a welding arc, wherein the welding power is regulated by specifying a welding current, wherein a supply voltage is determined, wherein a maximum supply current that can be delivered to the welding device by the energy source is specified, wherein a maximum supply capacity is calculated from the supply voltage and the maximum supply current, wherein a maximum welding power delivered by the welding device is determined from the maximum supply power, and wherein the welding power is limited to the maximum welding power that can be delivered.

2. The method according to claim 1, wherein the welding power is limited by limiting the welding current.

3. The method according to claim 1, wherein the maximum welding power delivered by the welding device is determined from the maximum supply power that can be delivered to the welding device by the energy source, taking into account an operating power.

4. A welding device for generating a welding arc by converting a supply power into a welding power, wherein the welding device is designed to regulate the welding power using a specified welding current, wherein a calculation unit is provided that is designed to calculate a maximum supply power from a supply voltage of the welding device and a maximum supply current that can be delivered to the welding device by an energy source, and to determine a maximum welding power delivered by the welding device from the maximum supply power, and wherein a limiting unit is provided, which is designed to limit the delivered welding power to the maximum welding power that can be delivered.

5. The welding device according to claim 4, wherein a measuring unit is provided that is designed to measure the supply voltage.

6. The welding device according to claim 4, wherein the limiting unit is designed to limit the welding current in order to limit the delivered welding power to the maximum welding power that can be delivered.

7. The welding device according to claim 4, wherein the limiting unit is designed to be activated and deactivated.

* * * * *